United States Patent [19]

Kamimura et al.

[11] Patent Number: 5,068,687
[45] Date of Patent: Nov. 26, 1991

[54] READER-PRINTER

[75] Inventors: Kuniaki Kamimura; Kenji Sawada; Yasushi Yamade, all of Osaka, Japan

[73] Assignee: Minolta Camera Kabushiki Kaisha, Osaka, Japan

[21] Appl. No.: 607,833

[22] Filed: Nov. 1, 1999

Related U.S. Application Data

[63] Continuation of Ser. No. 360,393, Jun. 2, 1989, abandoned.

[30] Foreign Application Priority Data

Jun. 7, 1988 [JP] Japan .................. 63-138545

[51] Int. Cl.$^5$ .................. G03B 27/58; G03B 13/28
[52] U.S. Cl. .................. 355/45; 355/355; 355/68; 355/218
[58] Field of Search .................. 355/43, 45, 40, 41, 355/218, 311

[56] References Cited

U.S. PATENT DOCUMENTS

| | | | |
|---|---|---|---|
| 3,901,593 | 8/1975 | Kogiso et al. | 355/218 |
| 4,239,371 | 12/1980 | Igarashi et al. | 355/218 |
| 4,708,464 | 11/1987 | Otsuki et al. | 355/45 |
| 4,739,368 | 4/1988 | Lachut et al. | 355/14 R |
| 4,750,021 | 6/1988 | Holroyd et al. | 355/41 |

FOREIGN PATENT DOCUMENTS

61-134749 6/1986 Japan .
62-47666 3/1987 Japan .

*Primary Examiner*—L. T. Hix
*Assistant Examiner*—D. Rutledge
*Attorney, Agent, or Firm*—Willian Brinks Olds Hofer Gilson & Lione

[57] ABSTRACT

A reader-printer for copying on a recording paper an image recorded in a microfilm is disclosed, which reader-printer is provided with shutter members capable of intercepting the projected light passing through the part of margin bordering the image. The size of the image in the microfilm is memorized in a memory. The size of the image to be copied and the size of the recording paper on which this image is to be formed are compared based on the ratio of magnification of projection of a projection lens to be used for projecting light through the image on a photosensitive member. The shutter members are driven based on a result of the comparison so that, of the path of the projected light directed to the photosensitive member, the part corresponding to the margin is automatically intercepted by the shutter members.

17 Claims, 9 Drawing Sheets

READER-PRINTER

This application is a continuation of application Ser. No. 07/360,393, filed June 2, 1989.

BACKGROUND OF THE INVENTION

1. Field of the Invention

This invention relates to a reader-printer which performs the function of projecting an image recorded in a microfilm on a screen and the function of printing this image. More particularly, this invention relates to a reader-printer so configured to prevent the margin of the microfilm from being recoded in the form of a black frame on the recording paper.

2. Description of the Prior Arts

The microfilm on the ordinary run has a margin around an image recorded therein. When a photosensitive member is exposed to such an image and a corresponding copied image is formed on a recording paper in the conventional reader-printer, therefore, the margin around the image manifests itself as a black frame on the recording paper.

As one solution for this problem, Japanese Patent Application Laid-Open No. SHO 61(1986)-134,749 discloses a reader-printer which is provided within the path of the light projected through an image with a light-intercepting member retractable in the axial direction of a photosensitive drum and further provided on the light-intercepting member with a light quantity sensor for control of the motion of the light-intercepting member necessary for shielding the region outside the image from the projected light. The reader-printer disclosed by this patent specification, however, necessitates the light quantity sensor for the detection of the boundary between the image and the margin and, therefore, suffers an increase in the number of component parts and proves disadvantageous in terms of cost and space.

U.S. Pat. No. 4,708,464 discloses a reader-printer which is provided within the path of the light projected through an image with a light-intercepting member retractable in the axial direction of a photosensitive drum and which, owing to the light-intercepting member, intercepts the path of the light projected through an unnecessary region of an image and permits copying only a part of the image. The reader-printer disclosed in this U.S. patent specification, however, entails an intricate operation because the operator is required to designate the range of the image and move the light-intercepting member accordingly.

SUMMARY OF THE INVENTION

A main object of this invention, therefore, is to provide a reader-printer which is simple in construction and is capable of preventing a margin around an image in a microfilm from manifesting itself as a black frame on a recording paper without requiring any intricate operation.

Another object of this invention is to provide a reader-printer which is provided with a memory for memorizing the size of an image recorded in a microfilm and an intercepting member for intercepting the part of the path of the light projected toward a photosensitive member corresponding to the margin part outside the image and which, therefore, is enabled to compare the magnifying ratio of projection and the size of the recording paper and cause automatically the intercepting member to intercept the margin part of the path of the projected light.

In accordance with the present invention, there is provided a reader-printer for projecting an image of a stated size recorded in a microfilm on a photosensitive member through a projection lens and for forming a corresponding copied image on a recording paper, which reader-printer comprises; positioning means for positioning the image in the microfilm at a prescribed position, magnification ratio detecting means for detecting the ratio of magnification of the projection lens, memory means for memorizing in advance information on the stated size of the image, arithmetic means for calculating the size of the copied image formed on the recording paper based on the detected ratio of magnification and the memorized information on the size, means for producing information on the size of the recording paper, and control means for controlling the copying operation so that only the copied image of the calculated size is formed on the recording paper when there is drawn a decision that the size of the calculated copied image is smaller than the size of the recording paper.

DESCRIPTION OF THE PREFERRED EMBODIMENTS

Now, the present invention will be described specifically below with reference to the drawings illustrating embodiments of the reader-printer of this invention.

Figure 1:
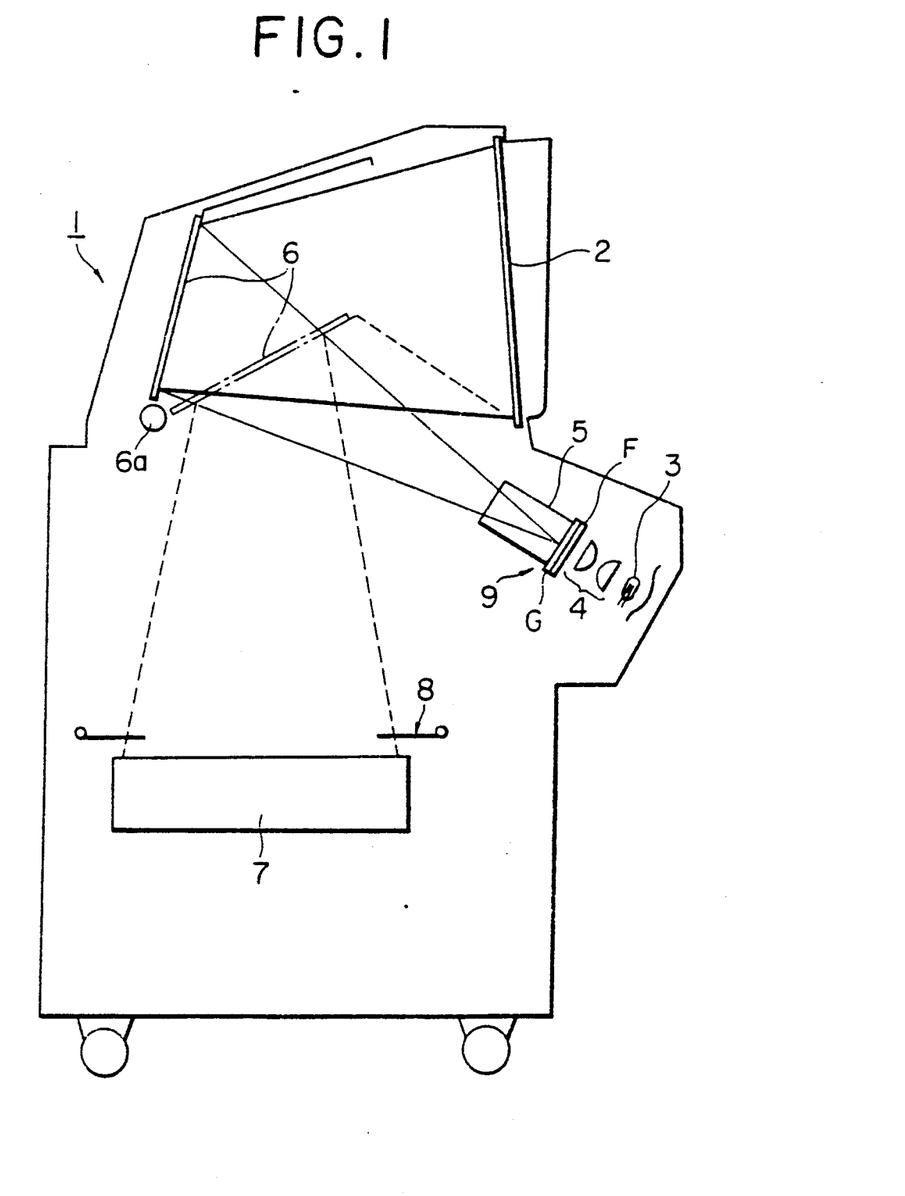
FIG. 1 is a schematic diagram illustrating the internal construction of the reader-printer of this invention.

As illustrated in FIG. 1, a main body 1 of a reader-printer is adapted to operate selectively in the reader mode for projecting an image frame recorded on a microfilm F as magnified on a screen 2 or in the printer mode for projecting the image frame as magnified on a photosensitive drum 7.

When the reader mode is selected, the light from a light source 3 is converged by a condenser lens system 4 and consequently caused to illuminate the microfilm F. The image light which has passed the microfilm F is magnified by a projecting lens 5. The magnified image light is reflected by a mirror 6 positioned at the reader position indicated by a continuous line in the diagram and consequently projected as magnified on the screen 2. The microfilm F is positioned between pressure glasses G which are incorporated in a carrier 9 for conveying the film.

When the printer mode is selected, the mirror 6 is rotated about a shaft 6a from the reader position mentioned above to the print position indicated by a two-dot one-dash line in the diagram and used for guiding the image light onto the photosensitive drum 7. The image light reflected by the mirror 6 after the rotation is projected through the medium of a shutter mechanism 8 onto the photosensitive drum 7, which is processed by the conventional method to give rise to a sensible image thereon and consequently a printed image on the recording paper.

Figure 2:
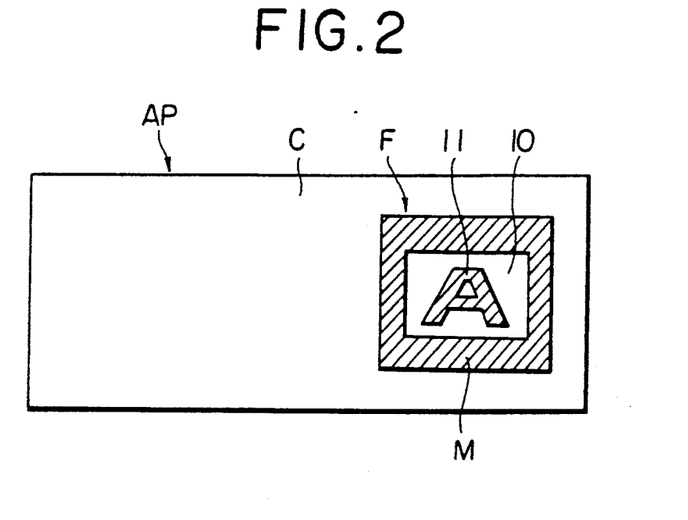
FIG. 2 is a plan view illustrating an aperture card having a microfilm applied fast thereto and adapted to be set in place in the reader-printer of this invention.

FIG. 2 is a diagram illustrating an aperture card AP as one typical microfilm F set in place in the reader-printer. This card AP possesses a card C for retaining a film having formed therein an aperture for fast application thereto of a microfilm F which has one frame of image photographed thereon. Since the illustrated microfilm F is a negative film, the part of a recoded image 11 and the margin part M bordering the image frame are formed as transparent spaces in an image frame 10. Since the aperture formed in the card C is generally perforated in a size larger than the frame 10 having the image of the microfilm F recorded therein, there occurs a transparent margin part M between the image frame 10 and the aperture as illustrated.

In the reader-printer the prevention of the occurrence of the black frame in the copying paper is attained owing to the presence of this transparent margin part M.

Figure 3:
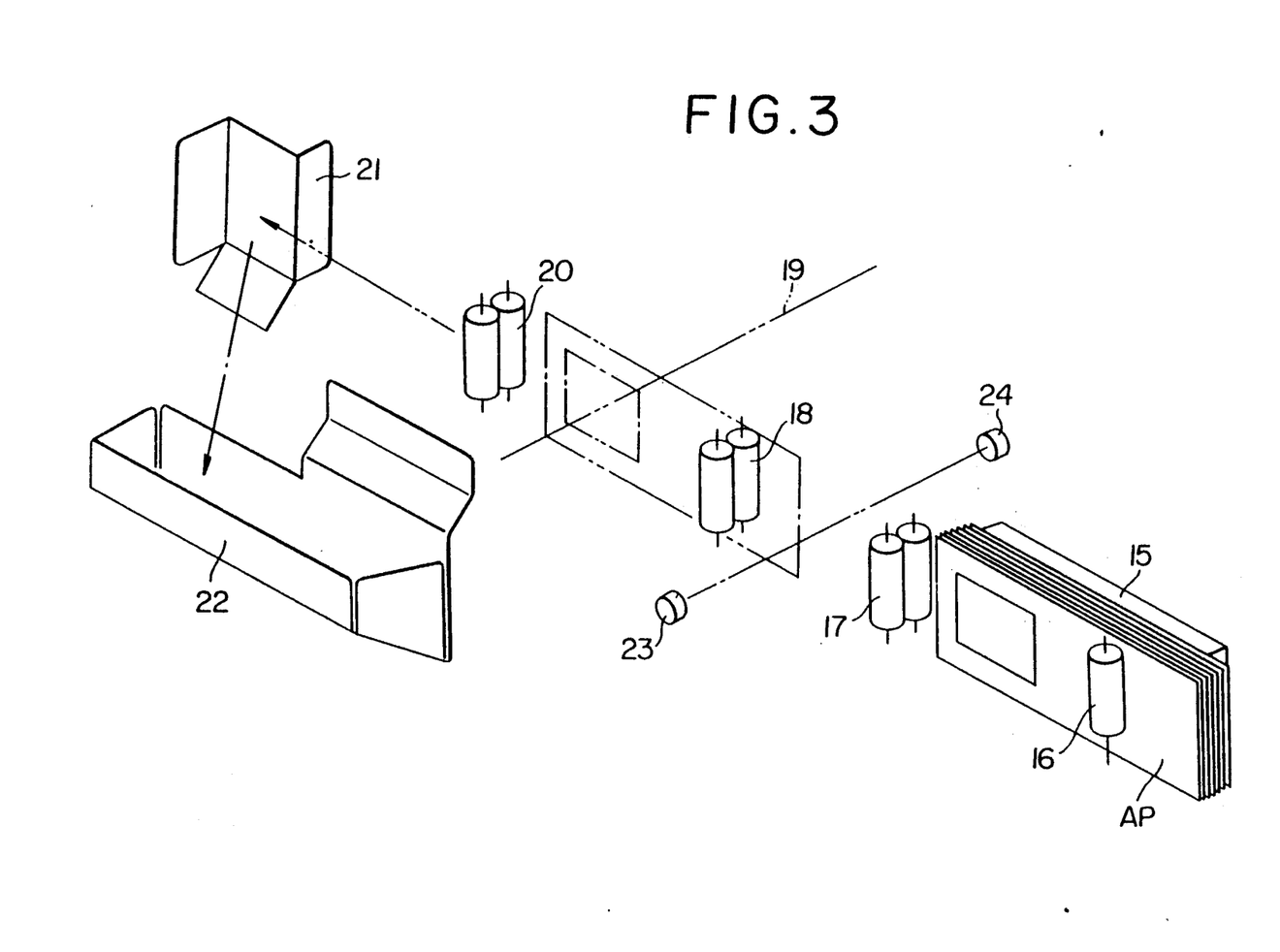
FIG. 3 is a perspective view illustrating a carrier incorporated in the reader-printer for the purpose of conveying the aperture card illustrated in FIG. 2.

FIG. 3 illustrates a carrier for automatically setting the aperture card AP between the pressure glasses G illustrated in FIG. 1. A plurality of aperture cards AP are set upright on their sides in a bundled state in a card supporting part which is installed in an operating part for the reader-printer. The card supporting part is provided with a supporting plate 15 and a feed roller 16 and is allowed to have the aperture cards AP supported between them. The aperture cards AP are paid out one by one by the rotation of the feed roller and are forwarded by two pairs of conveying rollers 17, 18 to the projection position indicated by a chain line in the diagram. At this projection position is disposed the pressure glasses G illustrated in FIG. 1 which are destined to be positioned on the opposite surfaces of the card AP. At this projection position, the microfilm A on the aperture card AP is illuminated and the image therein consequently projected on the screen 2 or the photosensitive member 7. In FIG. 3, the reference numeral 19 denotes the center of the path of a projected light or the optical axis of the projection lens 5.

After the treatment of projection, the aperture card AP at the projection position is forwarded through conveying rollers 20 to a guide plate 21 disposed at the terminal part of the carrier 9 by the rotation of the conveying rollers 18. The aperture card AP which has reached the guide plate 21 is dropped into a pocket 22 installed below the guide plate 21 and then discharged from the pocket 22.

Between the conveying rollers 17 and 18, a card sensor composed of a light-emitting element 23 and a light-receiving element 24 is disposed. When the aperture card AP is conveyed for a prescribed time following the detection of the aperture card AP by this sensor, the position of the microfilm A during the reader mode is so determined that the center thereof will coincide with the center 19 of the path of the projected light. In the reader-printer which adopts the film scanning method, during the projection for exposure mentioned above in the printer mode, the conveying rollers 18 synchronized with the rotation of the photosensitive drum 7 imparts a scanning motion of a fixed speed to the aperture card AP or the microfilm F. During this motion, a card drive motor (not shown) for driving the conveying rollers 18 incorporates therein an encoder for issuing pulses for motion proportionate to the amount of the rotation of the motor. The amount of rotation of the card drive motor during the prescribed period, namely the speed of motion of the aperture card AP, is varied relative to the zooming ratio because the length of the image in the feeding direction of the recording paper is required to be constant without reference to the magnitude of the zooming ratio. The disadvantage otherwise involved herein is eliminated by lowering the speed of motion mentioned above when the zooming ratio is high.

The reader-printer has been described as being operated by the film scanning method. Optionally, the lens scanning method resorting to the motion of the lens may be adopted in place of the film scanning method.

Figure 4:
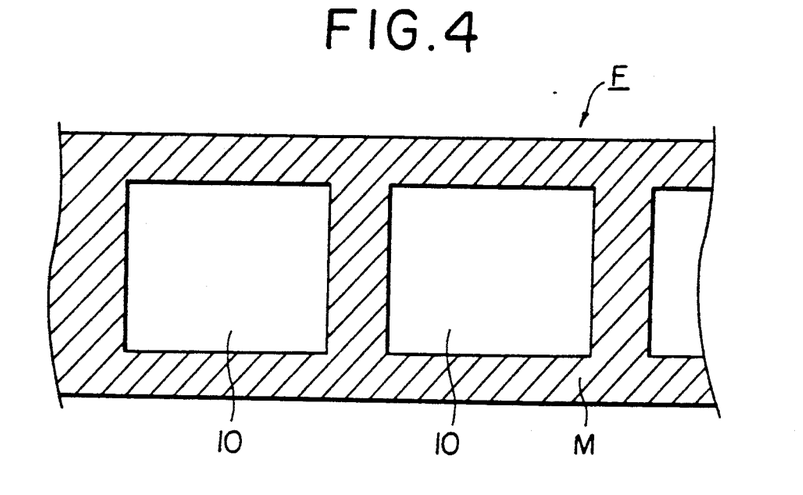
FIG. 4 is a plan view illustrating part of a ribbonlike microfilm as another type of microfilm.

FIG. 4 is a diagram illustrating part of a roll film F. Similarly to the microfilm applied fast to the aperture card AP, this roll film F is a negative film the margin M bordering the peripheries of image frames 10 recorded as spaced with fixed intervals in the roll film F are transparent. In the individual image frames 10, recorded letters and images (not shown) form transparent spaces.

The reader-printer illustrated in FIG. 1 uses the aperture card AP illustrated in FIG. 2. The reader-printer allows use of a roll of microfilm F illustrated in FIG. 4.

Figure 5:
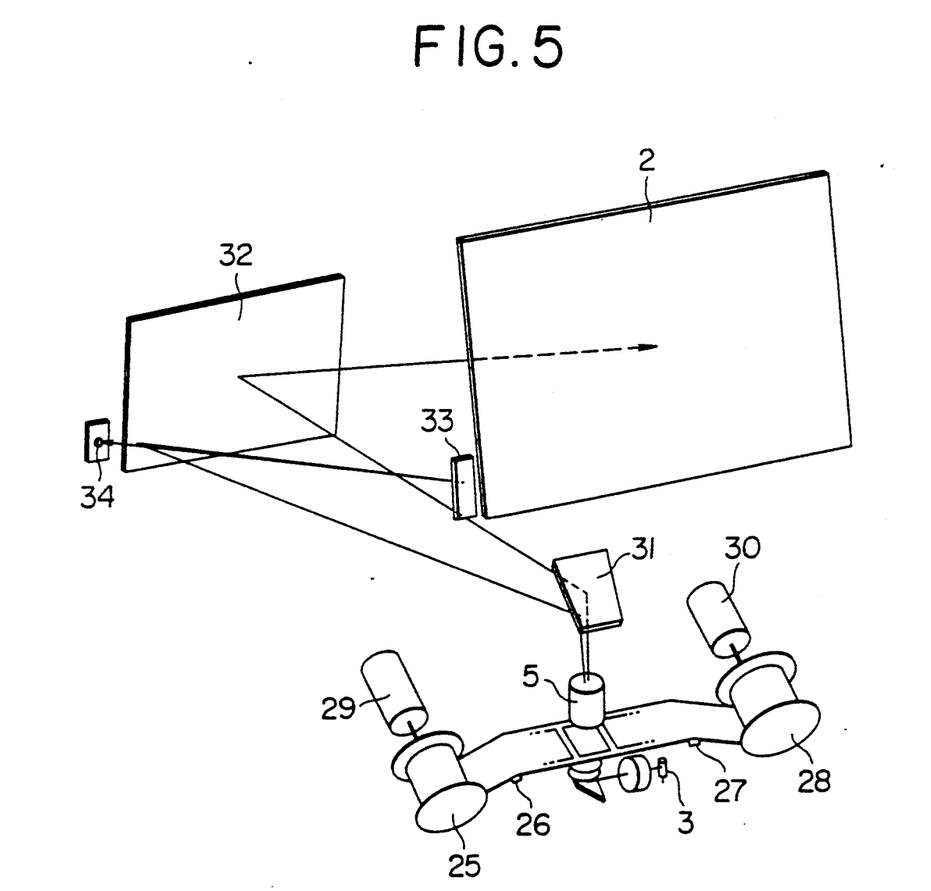
FIG. 5 is a perspective view illustrating a carrier incorporated in the reader-printer for the purpose of conveying a roll of microfilm.

FIG. 5 illustrates the carrier 9 for conveying the roll film F illustrated in FIG. 4. The roll film F wound up on a supply reel 25 is paid out via rolls 26, 27 and taken up on a takeup reel 28. The two reels 25, 28 are respectively connected to motors 29, 30. The operation of these motors 29, 30 enables the roll film F to be conveyed in the forward and backward directions. At the projection position fixed halfway along the film conveying path for guiding the film F, the roll film F is illuminated with the light from the light source 3 and the image in the microfilm F is projected on the screen 2 or the photosensitive element (not shown) through the medium of the projection lens 5 and mirrors 31, 32. By a mirror 33 disposed as juxtaposed to the screen 2, part of the beam of light is reflected in the direction of a sensor 34. This sensor 34 is adapted to discern the individual frames in the microfilm F by detecting the margins M intervening between the adjacent images recorded in the roll film F. Based on the output from this sensor 34 and by the use of the operation panel, the two motors 29, 30 are controlled for the desired frame supported in place to be brought to the projection position. Thus, the center of this frame is caused to coincide with the optical axis.

The microfilm to be used for the reader-printer of the present invention is of the type having a fixed frame size. The size of a frame to be recorded in a 35-mm film applied fast to the aperture card, a 35-mm roll film, and a microfiche is specified in Japanese Industrial Standard (JIS) Z6004 and Z6001.

Figure 6:
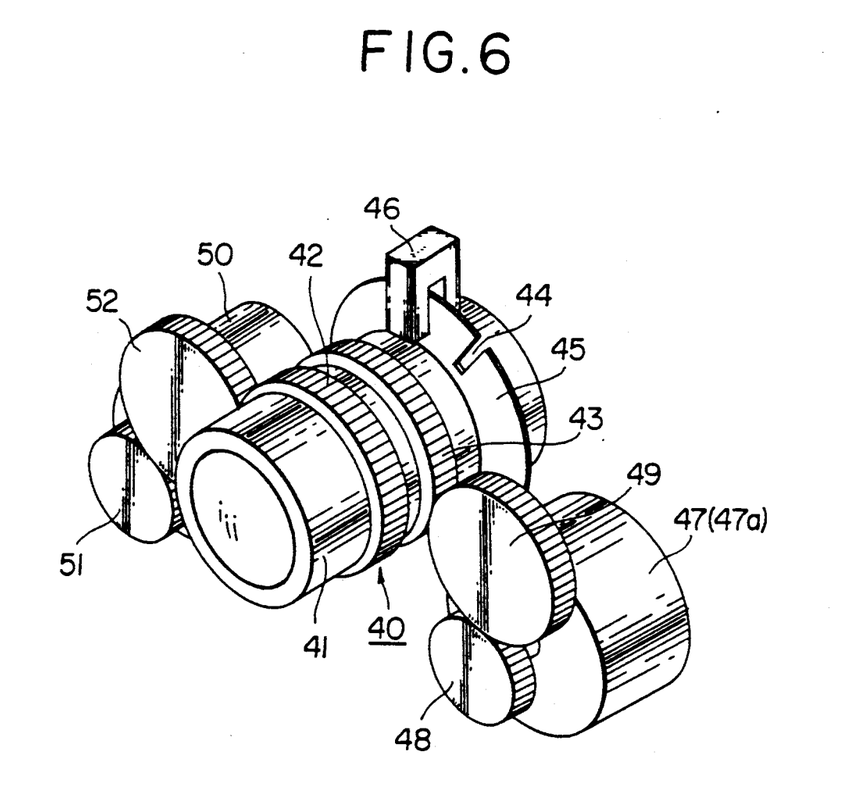
FIG. 6 is a perspective view illustrating a zoom lens incorporated in the reader-printer of this invention.

The projection lens 5 is formed of a zoom lens 40 possessing the zooming function as illustrated in FIG. 6.

This zoom lens 40 is provided with a lens-barrel 41 incorporating therein a plurality of stationary lenses and moving lenses (not shown). To the outer periphery of this lens-barrel 41, a focus gear 42 is attached rotatably relative thereto. The focus of the zoom lens is finely adjusted by the fact that the rotation of the focus gear 42 is transmitted via cam rings and pins (not shown) to the movable lenses.

Further to the outer periphery of the lens-barrel 41, a zoom rotary member 43 is attached rotatably relative thereto. The zooming ratio is adjusted by the fact that the rotation of the zoom rotary member 43 is transmitted via cam rings and pins (not shown) to the movable lenses. The zoom rotary member 43 is adapted to reciprocate between the smallest ratio of magnification and the largest ratio of magnification. The rotation of the zoom rotary member 43 is not infinite but is limited to the maximum approximately in the range of 100° to 150°.

On the outer periphery of the lens-barrel 41, an annular rotary member 45 fixed to the zoom rotary member 43 and adapted to rotate simultaneously therewith and provided at one portion thereof with a notch 44 serving as the index for the position of the zoom rotary member 43 is disposed. On the main body 1 side of the reader-printer, a photo-interrupter 46 is disposed, astraddle the rotary member 45 and adapted to discern the presence or absence of the notch 44 of the rotary member. Each time the photo-interrupter 46 detects the notch 44, the standard position of the zoom rotary member 33 is set. The existing zooming ratio is discriminated by the fact that the encoder described specifically hereinafter monitors the amount of rotation of the zoom rotary member 43 from the standard position.

For the operation of the zoom rotary member 43, the main body 1 of the reader-printer incorporates therein a zoom drive motor 47 having built therein an encoder 47a adapted to issue pulses for motion proportionately to the amount of rotation. A toothed wheel 48 fixed on the main shaft of this motor 47 is meshed with the teeth of the zoom rotary member 43 through the medium of an idle toothed wheel 49. This idle toothed wheel 49 is adapted to be meshed with the thread surface formed on the outer periphery of the zoom rotary member 43 at the time that the zoom lens 10 is attached to the main body 1. The zooming is effected by the fact that the rotation of the toothed wheel 48 generated by the motor 47 is transmitted to the zoom rotary member 43.

For the rotation of the focus gear 42, an idle toothed wheel 52 adapted to be meshed with a toothed wheel 51 connected to focus drive motor 50 is attached to the interior of the main body 1 of the reader-printer. The focus is adjusted by the transmission of the rotation of the idle toothed wheel 52 to the focus gear 42.

Figure 7:
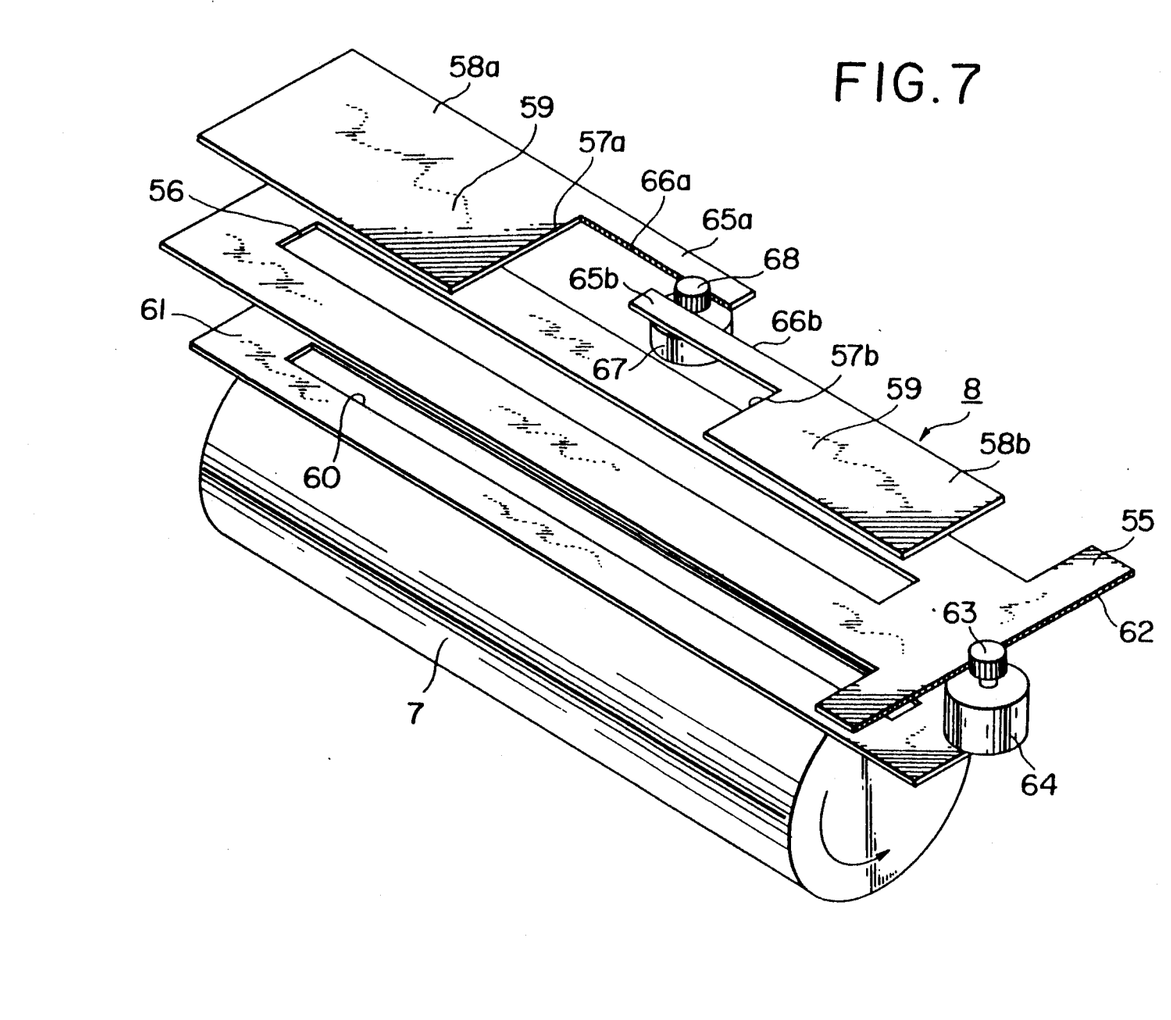
FIG. 7 is a perspective view illustrating a shutter mechanism incorporated in the reader-printer of this invention.

FIG. 7 illustrates in detail the shutter mechanism 8 disposed inside the main body 1 of the reader-printer and adapted to regulate the range of exposure of the photosensitive drum 7 to the image light emanating from the microfilm F when the printer mode is selected.

As illustrated in the diagram, the shutter mechanism 8 is provided with a main shutter member 55 disposed to be freely reciprocated in the direction of rotation or the lateral direction of the photosensitive drum 7 indicated by the arrow in the diagram. This main shutter part 55 serves to define the range in the longitudinal direction of the image to which the photosensitive drum 7 is exposed. In the main shutter 55, a slit 56 is formed as extended along the axial direction of the photosensitive drum 7. A side shutter member 59 is formed of a first shutter plate 58a having formed therein an intercepting edge 57a extended in the lateral direction of the photosensitive drum 7 and a second shutter plate 58b provided with an intercepting edge 57b extended parallelly to the intercepting edge 57a. This side shutter member 59 is disposed parallelly to the main shutter member 55. For the regulation of the range in the lateral direction of the image to which the photosensitive drum 7 is exposed, the two shutter plates 58a, 58b are adapted to be moved toward or away from each other in the direction along the rotary axis of the photosensitive drum 7.

Between the photosensitive drum 7 and the main shutter member 55, an exposure slit member 61 provided with a slit 60 extended in the direction along the axis of the rotation of the photosensitive drum 7 is disposed.

At one end of the main shutter member 55, rack teeth 62 are formed in the direction along the rotation of the photosensitive drum 7. A pinion gear 63 adapted to be meshed with the rack teeth 62 is fixed on the main shaft of a motor 64. By this motor 64, the main shutter member 55 is moved in the lateral direction. By the cooperation of the main shutter member 55 and the exposure slit member 61, the range of exposure to the image in the longitudinal direction is regulated.

The two shutter plates 58a, 58b illustrated are provided at the inner main parts thereof respectively with extended parts 65a, 65b. On these extended parts, rack teeth 65a, 66b are respective formed. A pinion 68 fixed on the main shaft of a motor 67 for driving the side shutter is meshed simultaneously with the rack teeth. The motor 67 moves the shutter plates 58a, 58b toward or away from each other. By the cooperation of the motor 67 and the exposure slit member 61, the size of the image in the direction of width is regulated.

The shutter mechanism 8, as described above, regulates the sizes of the image in the longitudinal and lateral directions by the fact that the main shutter member 55 and the side shutter member 59 are moved independently of each other, with a result that the part of the margin M of the image is inhibited from being exposed to the projected light for printing.

Figure 8:
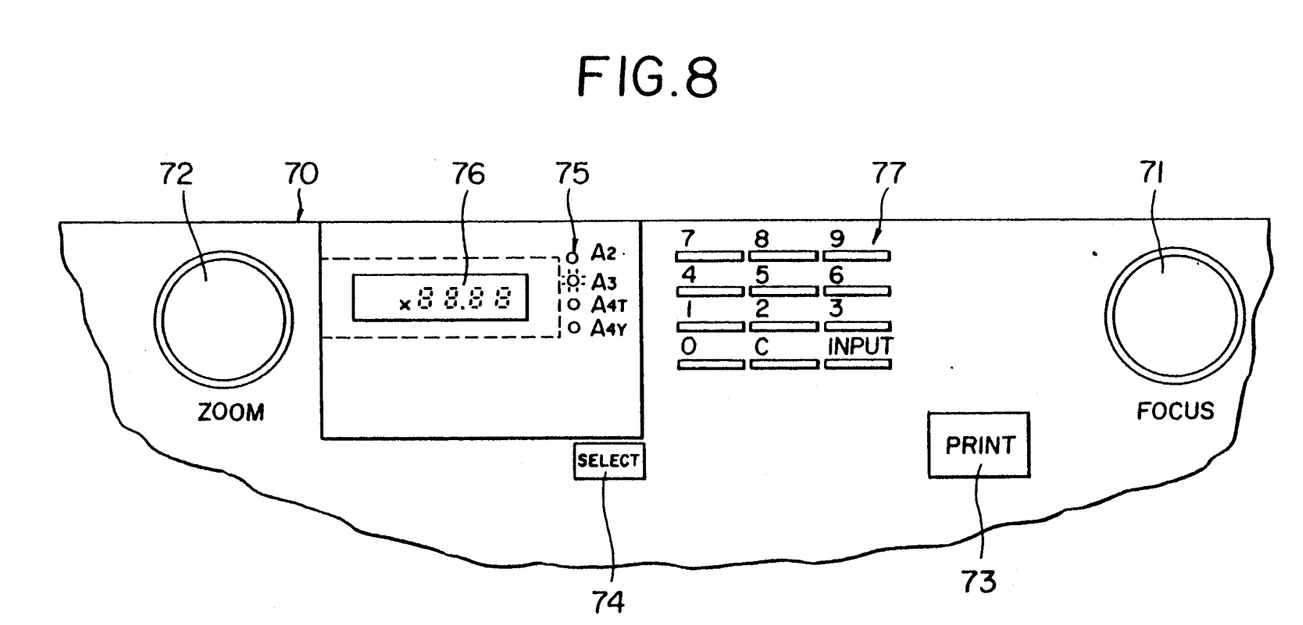
FIG. 8 is a plan view illustrating an operation panel installed on the reader-printer of this invention.

FIG. 8 illustrates an operation panel 70. This operation panel 70 is disposed in the central part on the front side of the main body 1 of the reader-printer.

On this operation panel 70, a focus dial for introducing numerical values of commands such as of the amount of rotation of the focus drive motor 50, a zoom dial 72 for introducing numerical values of commands such as of the amount of rotation of the zoom drive motor 47, a print switch 73 to be depressed in printing a retrieved image on the recording paper, a paper size select switch 74 for setting the size of the recording paper, and a size display part 75 for displaying the size of the recording paper by turning on the lamp LED located at the size position of the corresponding recording paper are set in place. Further on the operation panel 70 are a zoom display part 76 provided with four display elements each serving to display one numeral with seven lighting segments and adapted to display a four-digit zooming ratio and a ten-key pad 77 for introducing numerical values setting the zooming ratio to be used or the number of copying papers.

Figure 9:
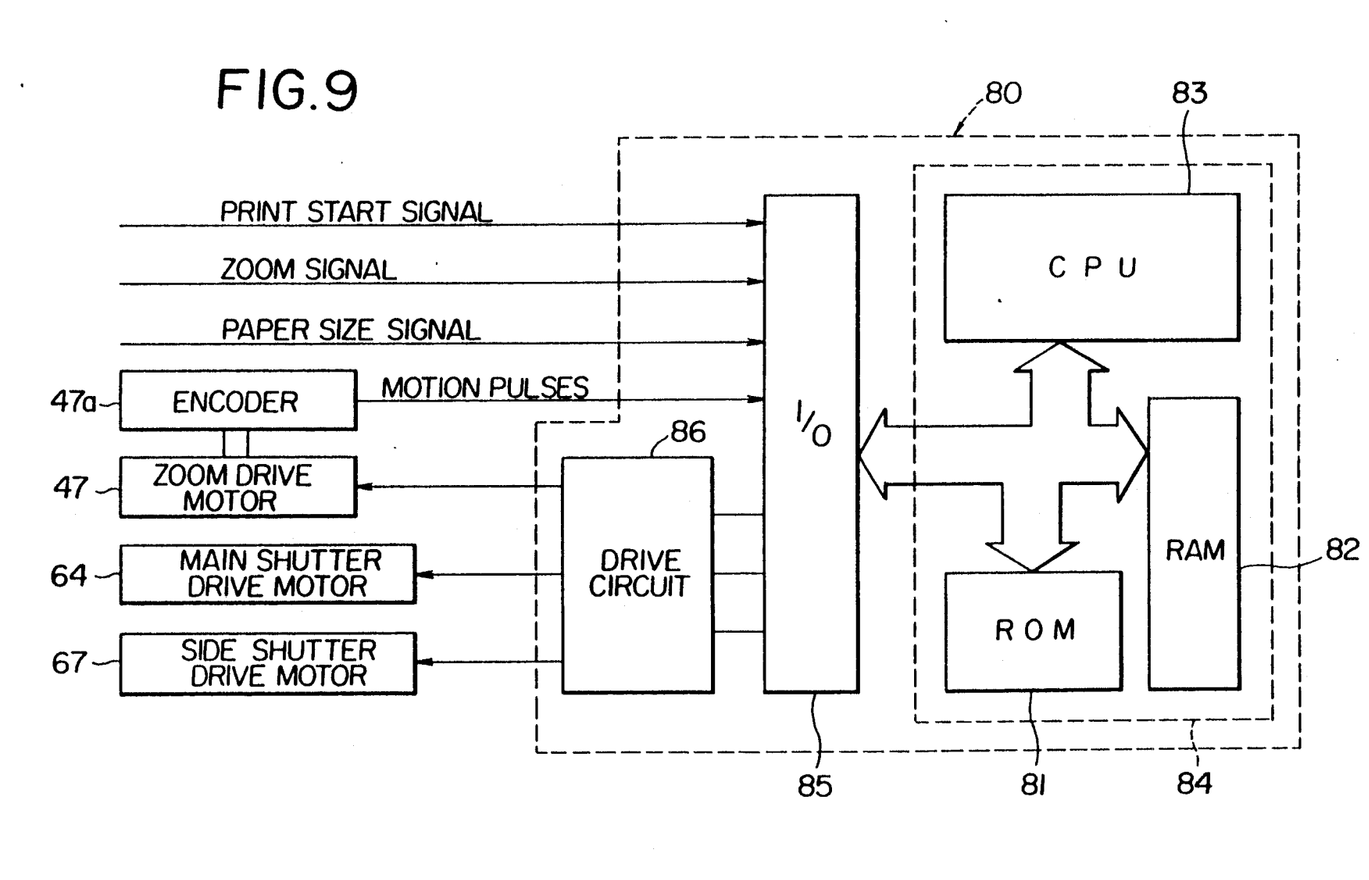
FIG. 9 is a block diagram illustrating a control circuit for controlling the operation of the reader-printer of this invention.

FIG. 9 is a block diagram illustrating a control circuit for the reader-printer configured as described above.

As illustrated in the diagram, a control circuit 80 is formed by causing an input-output port 85 having a drive circuit 86 connected thereto to be connected to a control part 84 comprising a ROM 81 for storing a program, for example, a RAM 82 for storing data, and a CPU 83 connected to the ROM 81 and the RAM 82 and adapted to serve as command means for performing an arithmetic operation on the data.

To the input-output port 85 are introduced a print start signal representing the information as to whether or not the print switch 73 has been depressed, a zoom signal representing the information as to the rotary position of the zoom rotary member 43, a paper size signal representing the paper size selected by the paper size select switch 75, and pulses for motion issued from the encoder 47a incorporated in the zoom drive motor 47. These signals are transferred to the CPU 83, there to be subjected to prescribed arithmetic operation based on the input signal. The results of these arithmetic operations are returned to the input-output port 85, there to be utilized for controlling the amounts of motion of the side shutter drive motor 67, the main shutter drive motor 64, and the zoom drive motor 47, for example, through the medium of the drive circuit 86.

Figure 10:
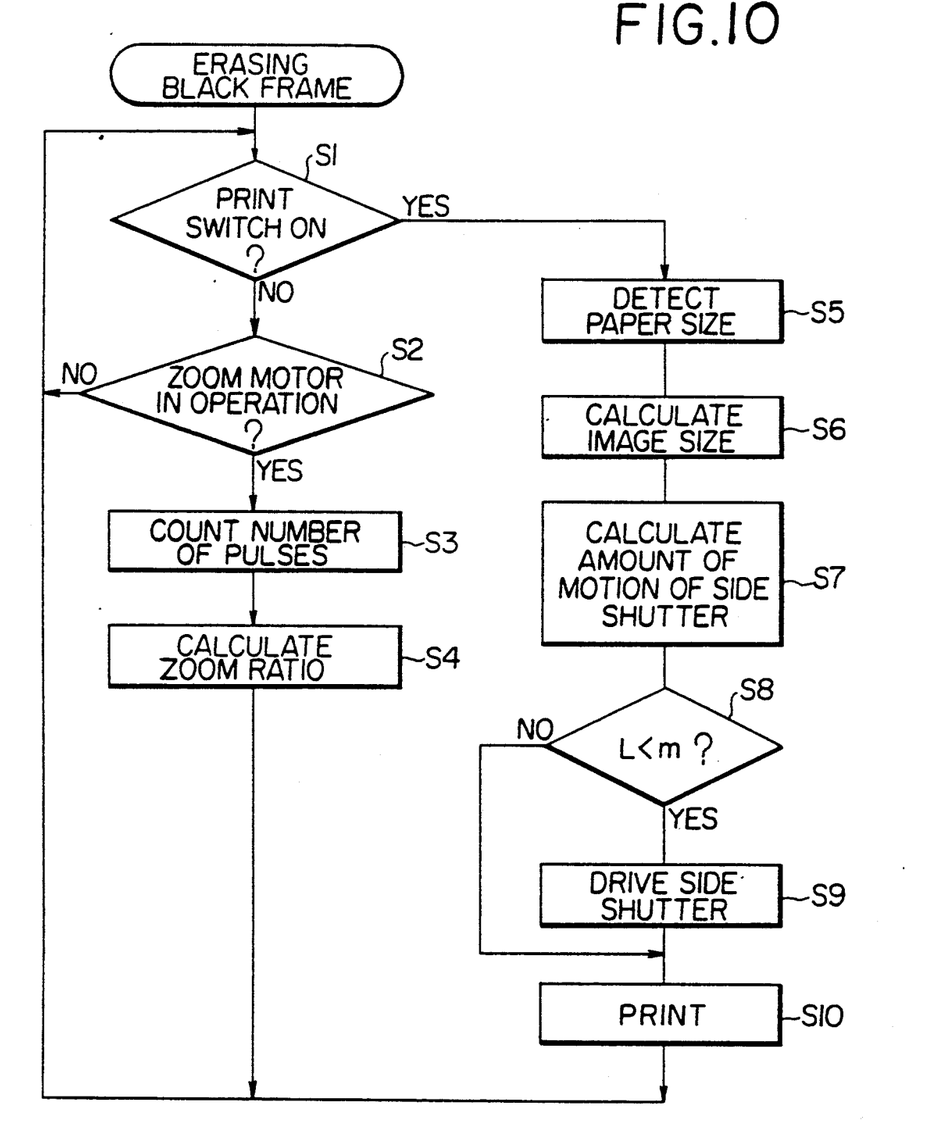
FIG. 10 is a flow chart illustrating the operation of the reader-printer of this invention.

Now, the operation of the reader-printer for precluding the formation of a black frame bordering a copied image will be described below with reference to the flow chart illustrated in FIG. 10.

First, the CPU 83 constantly monitors the input-output port 84 as to the presence or absence of the introduction of a print start signal from the print switch 73 (Step S1). When the monitoring at Step S1 confirms the absence of the introduction of the print start signal to the CPU 83, the CPU proceeds to draw at Step S2 a decision as to whether or not the zoom drive motor 47 is in operation. This decision is made by the fact that the number of pulse signals from the encoder 47a incorporated in the zoom drive motor 47 to be set operating on reception of the set value of zooming ratio from the zoom dial 72 or the ten-key pad 77 is counted based on the rotation position of the rotary member 45 at the time that the notch 44 formed in the rotary member 45 is detected by the photo-coupler 46.

The processing is returned to Step S1 when the decision at Step S2 is that the zoom drive motor 47 is not in operation. Conversely when the decision is that the zoom drive motor 47 is in operation, the CPU 83 takes count of the number of pulses for motion issued from the encoder (Step S3), calculates the existing zoom ratio by comparing the number of pulses for motion with the table indicating the zoom ratio corresponding to the number of pulses of rotation mentioned above (Step S4), displays the result of this calculation on the zoom display part 76 and, at the same time, stores the result at the stated address in the RAM 82, and returns the processing to Step S1.

In the meantime, when the monitoring at Step S1 discerns the fact that the print start signal has been introduced into the CPU 83, the CPU 83 admits the paper size signal from the paper size select switch 74 and consequently detects the paper size of the recording paper (Step S5), and stores this paper size at the stated address in the RAM 82.

Here, the image size L to be printed on the recording paper is found as the product of the existing zooming ratio (a) multiplied by the frame size (n) of the microfilm F applied fast to the aperture card AP. Thus, the image size L to be printed on teh recording paper is obtained by reading the existing zooming ratio (a) from the RAM 82 and, at the same time, reading the aforementioned frame size (n) stored in the ROM 81 and performing the calculation of the following formula. The image size L consequently obtained is put to storage at the prescribed address in the RAM 82 (Step S6).

$$L = a \times n \qquad \text{Formula 1}$$

After the arithmetic operation at Step S6, the CPU 83 reads the image size (L) and the paper size (m) as the results of the aforementioned arithmetic operation from the RAM 82, calculates the range for erasing a black frame based on the two sizes mentioned above, compares the range of erasure and the pulses of motion issued from the encoder incorporated in the card drive motor for deciding the speed of motion relative to the zoom ratio, proceeds to perform an arithmetic operation for determining the amount of motion of the side shutter member 59 and the open-close timing of the main shutter member 55, and put the result of this arithmetic operation in temporary storage in the RAM 82 (Step S7).

Then, the CPU 83 reads the image size (L) and the paper size (m) from the RAM 82 and compares the two sizes (Step S8). When the decision of Step S8 is that the image size (L) is smaller than the paper size (m), namely that the printing carried out in the existing state give rise to a black frame, the CPU 83 reads out of the RAM 82 the amount of motion of the side shutter member 59 resulting from the arithmetic operation at Step S7 and, based on the amount of motion, executes a command to drive the side shutter drive motor 67 (Step S9). Since the amount of motion of the side shutter member 59 is so calculated as to cover the part outside the image size (L), the occurrence of the black frame in the direction of width of the printed image can be prevented by the motion of the side shutter member 59 mentioned above.

When the decision in Step S8 is that the image size (L) is larger than the paper size (m), namely that the printing carried out in the existing state does not produce any black frame, the processing is advanced to Step S10. In this case, no black frame appears around the printed image on the recording paper even when the side shutter member 59 is not moved. In the absence of the motion of the side shutter member 59, however, the black frame occurs on the photosensitive drum 7. Even when the decision is that the occurrence of a black frame is not expected, the side shutter member 59 may be set driving, when necessary, similarly to Step S9.

After completion of the processing at Step S9, the CPU 83 reads out of the RAM 82 the open-close timing of the main shutter member 55 resulting from the arithmetic operation performed at Step S7 and, based on the open-close timing, executes a command to effect start or stop of the motor 64 (Step S10). Here, the open-close timing of the main shutter member 55 is calculated to cover the part outside the image size (L). To be specific, when the image size (L) is smaller than the paper size (m), the time for starting is delayed and the time for intercepting is advanced as compared with that used where the two sizes are equal. As a result, the occurrence of a black frame in the feeding direction of the printed image can be precluded.

Now, a typical calculation to be performed for determination of the range of erasure of black frame will be cited, for example. The initial conditions for this calculation are as follows.

Paper size, m ... A2 (420×594 mm)
Magnifying power of lens, a ... 10 magnifications Frame size, n ... 30.4×41.0 mm From Formula 1, the image size (L) is found as follows.

$$L = a \times n = 304 \times 410$$

No matter whether the image is present in or absent from this range, since the part outside the image is a non-transparent part, it is not printed and the waste of the toner is avoided.

The range intervening between the A2 size of the recording paper and the image size (L) mentioned above is to be covered, in the direction of width, with the side shutter member 59 and, in the feeding direction, by operating the main shutter member 55 at the prescribed open-close timing. The interception of the projected light need not be effected in an area perfectly identical with the image size but may be performed with some allowance for a narrow fringe jutting into the area of the calculated size.

The present embodiment has been described as using a zoom lens as the lens for projection. The present invention, however, is not limited to the zoom lens. Optionally, a plurality of single lenses may be used as the lens for projection. In this case, the embodiment of this invention is accomplished by providing means for detecting the magnifying power of the single lenses or a switch for manual introduction of the magnifying power of the single lenses.

In the illustrated embodiment, the formation of an image has been depicted as relying on the N-P method, namely the method of forming a positive image on a recording paper based on a negative film. Optionally, the P—P method resorting to use of a positive film may be adopted instead. In this case, the embodiment of this invention is accomplished by the erasure of light.

We claim:

1. An apparatus for projecting an original image of a microfilm onto a photosensitive member through a projection lens and forming a corresponding copied image on a recording paper, said apparatus comprising;
    positioning means for positioning the original image of the microfilm at a prescribed position,
    detecting means for detecting the magnification ratio of the projection lens,
    memory means for memorizing the size of the original image,
    arithmetic means for calculating a size of the copied image to be formed on the recording paper based on the magnification ratio of the projection lens and the size of said original image,
    means for providing a size of the recording paper, and
    control means for controlling a copying operation so that only the copied image of the calculated size is formed on the recording paper when the calculated size of the copied image is smaller than the size of the recording paper.

2. An apparatus according to claim 1, wherein said control means includes a main shutter member for intercepting the opposite end parts of the original image to be projected onto the photosensitive member and a side shutter member for intercepting the opposite lateral parts of the original image.

3. An apparatus for projecting an original image recorded on a microfilm onto a photosensitive member through a projection lens in order to form a copied image on a recording paper, said apparatus comprising:
    detecting means for detecting a magnification ratio of the projection lens,
    memory means for memorizing the size of the original image,
    means for calculating a size of the copied image to be formed on the recording paper based on the magnification ratio detected by said detecting means and the size of the original image memorized in said memory means, and
    control means for controlling a copying operation so that only the copied image of the calculated size is formed on the recording paper.

4. An apparatus according to claim 3, wherein said control means includes a main shutter member for intercepting the opposite end parts of the original image to be projected onto the photosensitive member and a side shutter member for intercepting the opposite lateral parts of the original image.

5. An apparatus according to claim 3, wherein the microfilm is applied to an aperture card and has the original image of a fixed size memorized by said memory means.

6. An apparatus according to claim 3, wherein the original image is positioned at a predetermined location when the original image is projected onto the photosensitive member.

7. An apparatus according to claim 3, wherein said control means is activated only when the calculated size of the copied image is smaller than a size of the recording paper.

8. A microfilm projection apparatus comprising;
    a projection lens for projecting an original image recorded on a microfilm onto a photosensitive member in order to form a copied image on a recording paper,
    detecting means for detecting a magnification ratio of the projection lens,
    memory means for memorizing the size of an original image,
    means for calculating an area on which the copied image is to be formed based on the magnification ratio detected by said detecting means and the size of the original image memorized in said memory means, and
    control means for preventing an image outside of the calculated area from forming on the recording paper.

9. An apparatus according to claim 8, wherein said control means includes a main shutter member for intercepting the opposite end parts of the original image to be projected onto the photosensitive member and a side shutter member for intercepting the opposite lateral parts of the original image.

10. An apparatus according to claim 8, wherein the microfilm is applied to an aperture card and has the original image of a fixed size memorized by said memory means.

11. An apparatus according to claim 8, wherein the original image is positioned at a predetermined location when the original image is projected onto the photosensitive member.

12. An apparatus according to claim 8, wherein said control means is activated only when the calculated size of the copied image is smaller than a size of the recording paper.

13. An apparatus for forming a copied image on a recording paper according to an original image recorded on a microfilm, said apparatus comprising:

memory means for memorizing the size of the original image, means for determining an area on which the copied image is to be formed based on the size of the original image memorized in said memory means, and control means for preventing an image outside of the determined area from forming on the recording paper.

14. An apparatus according to claim 13, wherein the microfilm is applied to an aperture card and has the original image of a fixed size memorized by said memory means.

15. An apparatus according to claim 13, wherein said control means is activated only when the determined area is smaller than a size of the recording paper.

16. An apparatus for generating an image information according to an original image recorded on a microfilm, said apparatus comprising;

memory means for memorizing the size of the original image, means for determining an area in which the image information is to be present based on the size of the original image memorized in said memory means, and control means for preventing image information outside of the determined area from generating.

17. An apparatus according to claim 16, wherein the microfilm is applied to an aperture card and has the original image of a fixed size memorized by said memory means.

* * * * *

UNITED STATES PATENT AND TRADEMARK OFFICE
CERTIFICATE OF CORRECTION

PATENT NO. : 5,068,687

DATED : November 26, 1991

INVENTOR(S) : Kuniaki Kamimura, et al.

It is certified that error appears in the above-identified patent and that said Letters Patent is hereby corrected as shown below:

In col. 1 of the cover page, change the filing date of the application (numbered item "[22]") from "Nov. 1, 1999" to --Nov. 1, 1990--.

In col. 1, line 14, change "recoded" to --recorded--.

In col. 3, line 52, before "consequently", insert --is--.

In col. 5, line 26, after "disposed", delete --,-- (comma).

In col. 6, line 30, change "65a" to --66a--; change "respective" to --respectively--.

In col. 7, line 66, change "teh" to --the--.

Signed and Sealed this

Thirtieth Day of March, 1993

*Attest:*

STEPHEN G. KUNIN

*Attesting Officer*  *Acting Commissioner of Patents and Trademarks*